United States Patent
Bogner et al.

(10) Patent No.: US 6,425,347 B1
(45) Date of Patent: Jul. 30, 2002

(54) LIVESTOCK INCUBATOR

(76) Inventors: Daniel G. Bogner; Teresa D. Bogner, both of 7800 20th Rd., Galesburg, KS (US) 66740

(*) Notice: Subject to any disclaimer, the term of this patent is extended or adjusted under 35 U.S.C. 154(b) by 7 days.

(21) Appl. No.: 09/710,748

(22) Filed: Nov. 9, 2000

(51) Int. Cl.[7] .............................. A01K 41/02; F24H 3/02
(52) U.S. Cl. ...................... 119/318; 119/315; 119/453; 119/496; 219/386
(58) Field of Search ................................ 119/318, 311, 119/315, 328, 453, 479, 482, 496, 480, 500, 668, 606, 677, 678; 600/21, 22; 219/400, 385, 386

(56) References Cited

U.S. PATENT DOCUMENTS

| | | | |
|---|---|---|---|
| 2,627,841 A | * | 2/1953 | Johnson ....................... 119/302 |
| 2,821,165 A | * | 1/1958 | Wright ......................... 119/482 |
| 2,881,733 A | * | 4/1959 | Young, Jr. et al. .......... 119/416 |
| 3,962,993 A | * | 6/1976 | Dattilo ........................ 119/500 |
| 3,985,102 A | * | 10/1976 | Yonezawa ................... 119/416 |
| 4,183,323 A | * | 1/1980 | Maines ........................ 119/416 |
| 4,201,153 A | * | 5/1980 | Nace ........................... 119/200 |
| 4,292,929 A | * | 10/1981 | Tellers ......................... 119/518 |
| 4,370,947 A | | 2/1983 | Hilken |
| 4,559,903 A | * | 12/1985 | Bloom et al. ............... 119/416 |
| 4,846,783 A | | 7/1989 | Koch et al. |
| 4,936,824 A | | 6/1990 | Koch et al. |
| 5,134,969 A | * | 8/1992 | Mason et al. ................ 119/472 |
| 5,140,947 A | * | 8/1992 | Bruce .......................... 119/502 |
| 5,216,977 A | * | 6/1993 | Allen, Jr. .................... 119/500 |
| 5,542,375 A | | 8/1996 | Voren |
| 5,638,771 A | | 6/1997 | Voren |
| 5,655,484 A | * | 8/1997 | Aaberg ........................ 119/735 |
| 5,727,503 A | * | 3/1998 | Whittaker ................... 119/500 |
| 5,775,261 A | * | 7/1998 | Shaw .......................... 119/482 |
| 5,823,143 A | | 10/1998 | Wilson |
| 5,979,364 A | * | 11/1999 | Ricketts ...................... 119/496 |
| 6,039,006 A | | 3/2000 | Pearce |
| 6,058,886 A | * | 5/2000 | Haines ........................ 119/601 |
| 6,182,612 B1 | * | 2/2001 | Ross, Sr. ..................... 119/161 |

FOREIGN PATENT DOCUMENTS

GB           2137466 A    * 10/1987

* cited by examiner

Primary Examiner—Yvonne R. Abbott
(74) Attorney, Agent, or Firm—John D. Gugliotta

(57) ABSTRACT

A portable livestock incubating device is provided formed of a rectangular container having and incubating volume forming an incubating chamber defined by the zone within the incubating volume. Each each end wall further includes an access door hingedly attached to an upper portion above a clean out door for providing ingress and egress of livestock. Each access door has an exhaust vent located at an upper portion whereby heated air, generated via an electric heater within said the incubating chamber exhausts therethrough. A base with wheels mounted thereon for facilitating transportation of the portable livestock incubating device.

11 Claims, 3 Drawing Sheets

LIVESTOCK INCUBATOR

RELATED APPLICATIONS

The present invention was first described in Disclosure Document No. 474,828 filed on May 30, 2000. There are no previously filed, nor currently any co-pending applications, anywhere in the world.

BACKGROUND OF THE INVENTION

1. Field of the Invention

The present invention relates generally to animal incubators and, more particularly, to a portable livestock incubating container.

2. Description of the Related Art

Keeping animals is a never-ending task, requiring one to constantly feed groom and clean-up after their animal charges. For those that raise or care for young or ill animals, their responsibilities are compounded many times over. Many young or ill animals require the environment of an incubator to recover, grow or even live. While incubators are often available at veterinarian offices or even in larger farms, they are not found at smaller farms where they would be needed only occasionally. Even if they are readily available, the animal must be transported from the barn, pasture, or similar location to the incubator location. This time is often spent in a cold trailer or truck, which does nothing to improve the health of the animal.

Accordingly, there is a need for a means by which young or ill animals can be lodged in an incubator at almost any location and be afforded the luxury of being transported in an incubator as well. The development of the portable livestock incubating container fulfills this need.

A search of the prior art did not disclose any patents that read directly on the claims of the instant invention; however, the following references were considered related. The following patents disclose a bird egg incubation system and method: U.S. Pat. No. 6,039,006 issued in the name of Pearce; U.S. Pat. No. 5,638,771 issued in the name of Voren; and U.S. Pat. No. 5,542,375 issued in the name of Voren.

U.S. Pat. No. 5,823,143 issued in the name of Wilson describes a newborn animal incubator for use in conjunction with an automobile.

U.S. Pat. No. 5,730,355 issued in the name of Lessard et al. discloses an infant incubator with an integrated air system.

U.S. Pat. No. 5,140,947 issued in the name of Bruce describes a newborn animal incubator.

U.S. Pat. No. 4,936,824 issued in the name of Koch et al. discloses an infant incubator with an air curtain.

U.S. Pat. No. 4,370,947 issued in the name of Hilken describes a tropical fish incubator.

U.S. Pat. No. 4,846,783 issued in the name of Koch et al. discloses an incubator for infants to maintain a warm environment.

Consequently, a need has been felt for providing a device which allows for the care and feeding of young or ill livestock in a manner which allows them to be moved about quickly and in a portable manner.

SUMMARY OF THE INVENTION

Therefore, it is an object of the present invention to provide an animal incubator which protects young or ill animals for farms, zoos, and the like.

It is another object of the present invention to provide an animal incubator which provides space for up to two animals and provides transportation of the animals as well.

It is still another object of the present invention to provide an animal incubator which allows for the storage of food, water, and veterinarian supplies.

It is still another object of the present invention to provide an animal incubator which is internally illuminated.

It is another object of the present invention to provide an animal incubator having two, 300 watt heaters equipped with a variable speed fan for heated air circulation.

It is another object of the present invention to provide an animal incubator with a wire-mesh floor for keeping animals up off the hard cold floor and for allowing animal waste and grain spillage to fall therethrough.

It is another object of the present invention to provide an animal incubator having a clear plastic window which allows viewing the progress of the animal without opening the incubator and is also easily cleaned.

It is another object of the present invention to provide an incubator device with a rechargeable 12 volt battery for powering all electrical components and allows the invention to be portable.

It is another object of the present invention to provide an animal incubator which can be used with all kinds of animals including but not limited to cats, dogs, calves, and colts.

Briefly described according to one embodiment of the present invention, a portable livestock incubating container is disclosed for providing a means by which up to two young or ill livestock can be lodged therein at almost any location and be afforded the luxury of being transported in an incubator as well. The invention is manufactured with an aluminum frame, similar to that commonly utilized in the construction of transfer truck sleeper cabs. The invention has overall dimensions of approximately 8 feet in length by 6 feet in height by 4 feet in width. The invention includes a clear plastic viewing window and a wire mesh floor. Located within the incubating container on a sidewall just below the ceiling portion are a pair of 300 watt, 12 volt, electric heaters powered by a rechargeable battery. A variable speed fan, also powered by the battery, provides for the heating of the invention. Internal lights, along with storage compartments for water bottles, feeding bags, veterinarian supplies and the like are also provided.

The use of the present invention allows for the care and feeding of young or ill livestock in a manner which allows them to be moved about quickly and in a portable manner.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
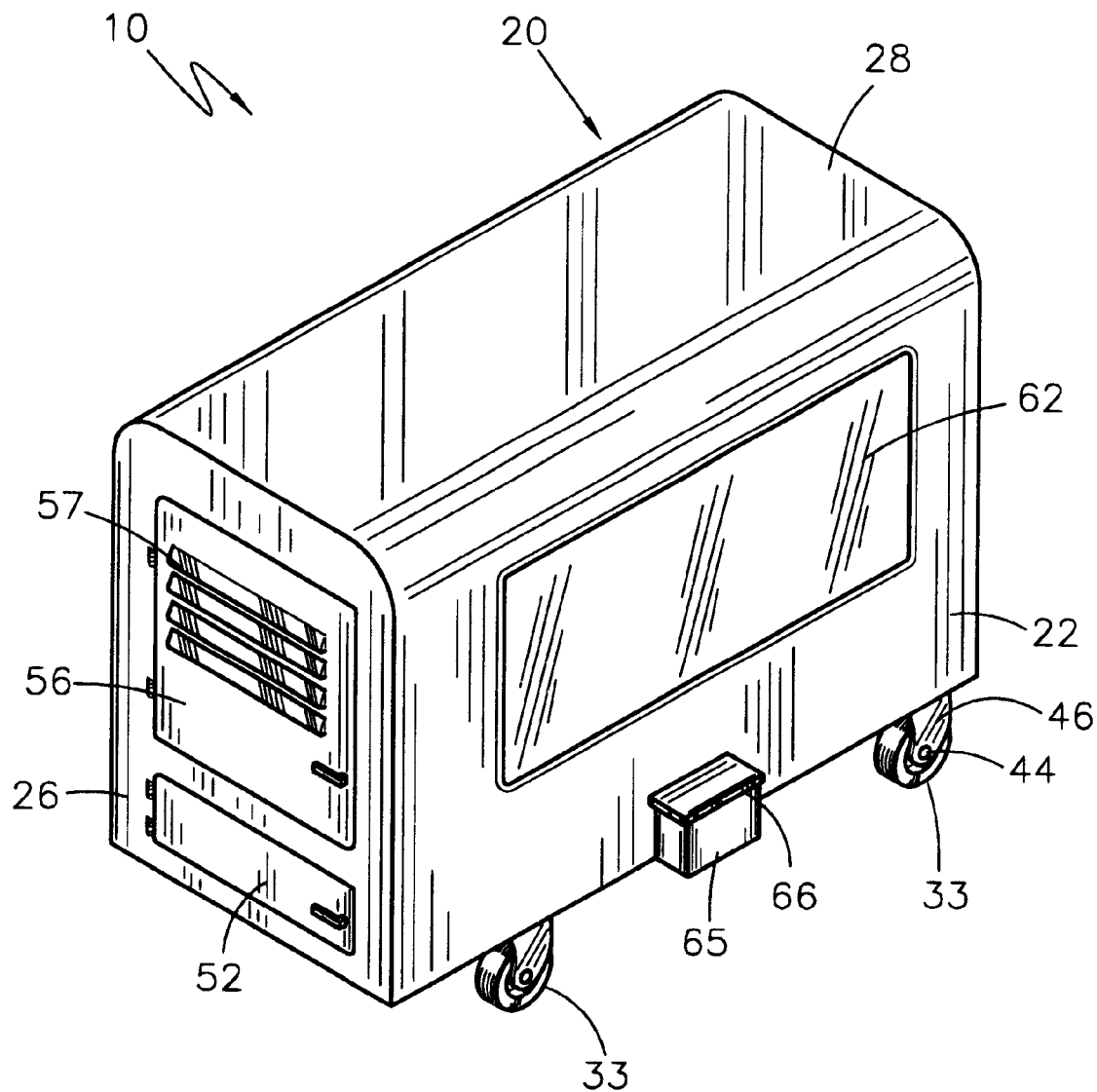
FIG. 1 is a perspective view of a portable livestock incubating container according to the preferred embodiment of the present invention.
Figure 2:
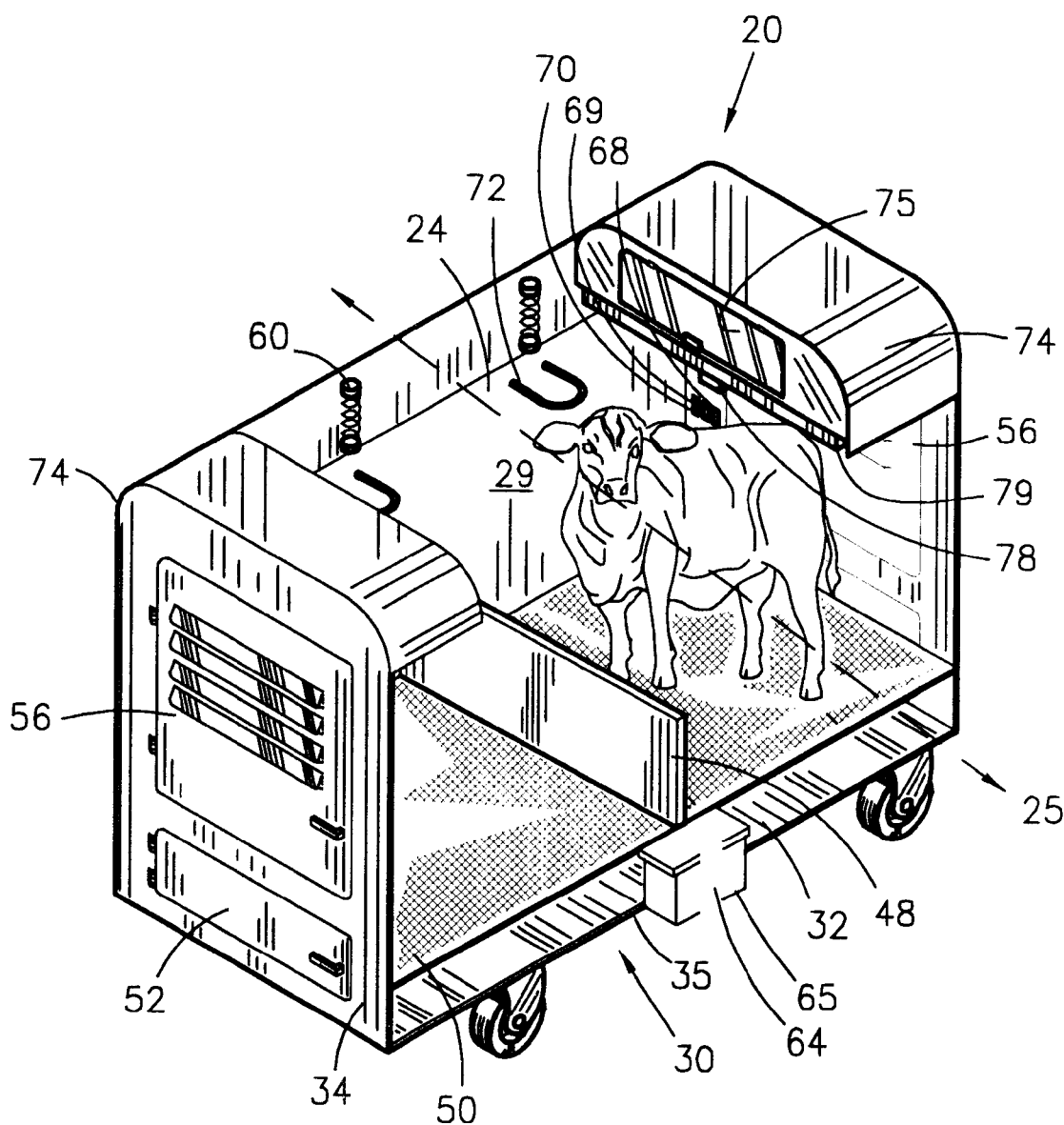
FIG. 2 is a perspective view of the portable livestock incubating container shown with the top and clear plastic removed so as to reveal internal components according to the preferred embodiment of the present invention.
Figure 3:
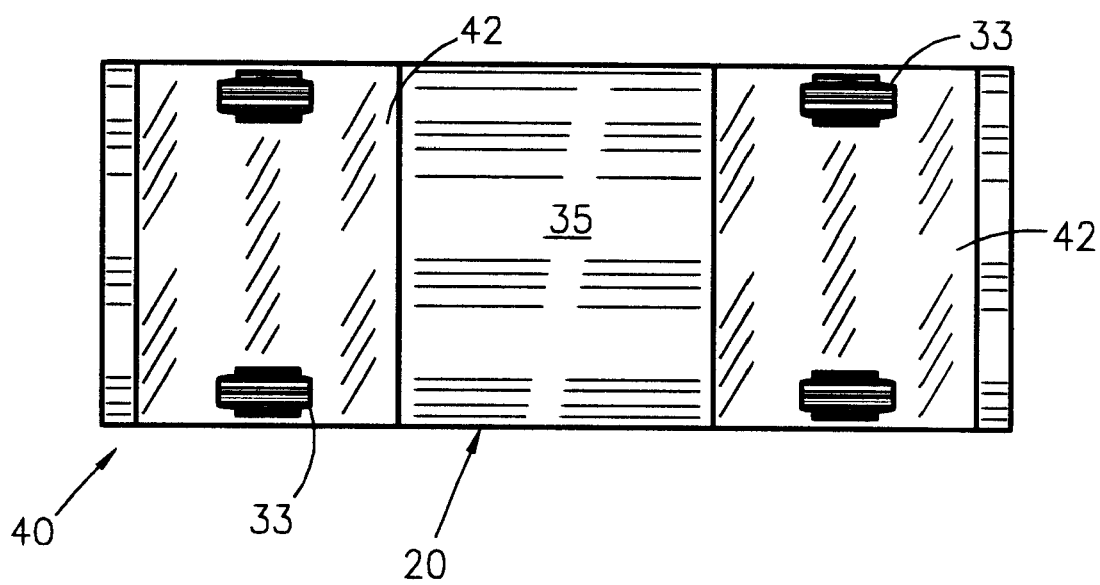
FIG. 3 is a bottom plan view of the preferred embodiment of the present invention.

Referring now to FIGS. 1–3, a portable livestock incubating container 10 is shown, according to the present invention, comprised of a generally rectangular incubating container 20 with a first and a second sidewall 22, 24, end walls 26, a top 28, an incubating chamber 29 defined by the zone within the incubating container 20, and a base 30 with wheels 33 mounted thereon for facilitating transportation of the portable livestock incubating container 10. Alternately, fork guides, cr holders can me mounted along the lower surface for guiding a conventional fork lift. In this manner, a fork lift can be used to lift the entire unit onto a truck for transporting.

The portable livestock incubating container 10 provides a means by which young or ill livestock can be lodged therein at almost any location and be afforded the luxury of being transported in an incubator as well.

The incubating container 20 is constructed of an aluminum material similar to that commonly utilized in the construction of transfer truck sleeper cabs.

The base 30 of the incubating container 20 includes side walls 32, end walls 34 and a bottom side 35. Wheels 33 are mounted on the bottom side 35 of the base 30 via a wheel assembly 40 so as to facilitate transportation of the incubating container 20. The wheel assembly 40 includes a wheel support chassis 42, axles 44, and axle supports 46.

The incubating container 20 has dimensions measuring approximately 8 feet in length by 6 feet in height by 4 feet in width, thereby providing space for allowing two young or ill livestock to be lodged therein.

A linearly elongated, rectangular floor divider 48 is mounted transversely and perpendicularly along a linearly elongated centerline of a wire-meshed floor 50 in an upright fashion so as to provide a divider forming two lodging compartments for accommodating two animals within the incubating container 20. The floor divider 48 extends vertically approximately 1 foot from the wire-meshed floor 50. A side wall-to-side wall axis 25 extends linearly from the first sidewall 22 to the second sidewall 24. The wire-meshed floor 50 is disposed on an upper surface of the side walls 32 and end walls 34 of the base 30, thus the wire-meshed floor 50 is elevated from the bottom side 35 of the base 30 so as to form space therebetween for facilitating the collecting of animal waste and spilled grain within the base 30 of the incubating container 20.

Each end wall 26 of the incubating container 20 includes a generally rectangular clean out door 52 hingedly attached to a lower portion thereof so as to provide access to the base 30 wherein animal waste and spilled grain have collected and can subsequently be removed.

Each end wall 26 further includes an access door 56 hingedly attached to an upper portion thereof above the clean out door 52 for providing ingress and egress of livestock. Each access door 56 has an exhaust vent 57 located at an upper portion thereof whereby heated air, generated via electric heaters 60 (to be described in greater detail below), within the incubating chamber 29 exhausts therethrough so as to assure the young or ill livestock have a continuous supply of warm, dry air.

A generally rectangular, transparent clear plastic window 62 is located on the first sidewall 22 and measures approximately 40 inches in length by 30 inches in width. The clear plastic window 62 allows one to view progress of ill livestock without the need for opening the access door 56 of the incubating container 20, and is also easily cleaned.

A pair of 300 watt, 12 volt, electric heaters 60 powered by a rechargeable battery 64 are mounted to an inside surface of the second side wall 24 near the top 28 of the incubating container 20. Each electric heater 60 is positioned equidistant from each other, separated by the side wall-to-side wall axis 25.

The battery 64 is stored within a protective housing 65 constructed of aluminum material having a closable lid 66, wherein the protective housing 65 is mounted to an outer lower surface of the first side wall 22 below the clear plastic window 62.

An on/off switch 68 is located on an inside surface of either end wall 26 of the incubating container 20, adjacent to the access door 56 for activating and deactivating the electric heaters 60.

A variable fan speed switch 69 is located adjacent to the on/off switch 68 so as to facilitate heated air circulation through the incubating chamber 29 of the incubating container 20. It is envisioned that the variable fan speed switch 69 will provide low, medium and high settings.

A thermostatic control 70 is located adjacent to the variable fan speed switch 69 for ensuring air temperature inside the incubating chamber 29 is held at a safe level, preferably between 70° F. and 90° F.

A pair of u-shaped bottle holders 72 are mounted to the inside surface of the second side wall 24, wherein each bottle holder 72 is positioned below and interior to each respective electric heater 60 so as to be easily accessed by livestock. Each of the pair of u-shaped bottle holders 72 are designed and configured so as to slidably receive and hold a water bottle therein for providing water to livestock taking lodge within the incubating container 20.

A pair of storage compartments 74 of a generally rectangular, hollow configuration are integrally formed above each access door 56 inside the incubating container 20. Each storage compartment 74 has a lockable compartment door 75 hingedly attached thereto for allowing access therein and for securing contents within the storage compartment 74. It is envisioned that the storage compartments 74 will contain water bottles, feeding bags, veterinarian supplies, and other similar supplies for maintaining or advancing the health of livestock taking lodge within the incubating container 20, and/or during the period when transporting livestock to a veterinarian or other location.

In the likely event livestock becomes ill at nighttime hours or during early morning hours, thereby requiring utilization of the incubating container 20, a pair of internal lights 78 are provided. Each of the pair of internal lights 78 are mounted on a lower surface of each storage compartment 74, just below the compartment door 75. The internal lights 78 are activated by an on/off switch 79 located adjacent to each internal light 78. The internal lights 78 illuminate the entire incubating chamber 2 9, thereby allowing one to easily view progress of ill livestock through the clear plastic window 62 without the need for opening the access door 56 during nighttime or early morning hours.

All electrical components including the electric heaters 60, the on/off switch 68, the variable fan speed switch 69, the thermostatic control 70, and the internal lights 78 are powered via the battery 64.

It is envisioned that the present invention can be utilized with all kinds of animals including but not limited to cats, dogs, calves, and colts.

2. Operation of the Preferred Embodiment

To use the present invention, one or two animals are placed by a user within the incubating chamber 29 of the incubating container 20 by way of the access doors 56. Electric heaters 60 are turned on via the on/off switch 68 and the thermostatic control is set to a desired temperature. Next, the user selects a desired setting of the variable fan speed switch. In the event supplies for maintaining or advancing the health of livestock are required, such as water, grain, or veterinarian supplies, the user obtains such items from within the storage compartments 74 where they are securely stored therein. Water bottles are placed within the u-shaped bottle holders 72 and grain is provided for the livestock. The access doors 56 are then closed, and the present invention provides heated circulated air via the electric heaters 60 through the incubating chamber 29. Heated air exhausts through the exhaust vents 57 of the access doors 56 so as to ensure the young or ill livestock have a continuous supply of warm, dry fresh air. The clear plastic window 62 allows the user to view progress of ill livestock without the need for opening the access door 56 of the Incubating container 20.

In the event livestock becomes ill at nighttime hours or during early morning hours, the user initially turns on the internal lights 78 via an on/off switch 79 before carrying out the aforementioned operation. Once the internal lights 78 are turned on, the operation of the present invention is then performed as stated hereinabove. The internal lights 78 allow the user to easily view progress of ill livestock through the clear plastic window 62 without the need for opening the access door 56 during times of darkness.

In the event the user desires to transport the present invention to a veterinarian or some other location, the portable livestock incubating container 10 is provided with wheels 33 mounted to the base 30 thereof for facilitating transportation of the invention.

The use of the present invention allows for the care and feeding of young or ill livestock in a manner which allows them to be moved about quickly and in a portable manner.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

What is claimed is:

1. A portable livestock incubating device comprising:
   a container having of a generally rectangular incubating volume having a first and a second sidewall, end walls, a top, and an incubating chamber defined by the zone within the incubating volume, wherein each end wall further includes an access door hingedly attached to an upper portion thereof above a clean out door for providing ingress and egress of livestock and each access door has an exhaust vent located at an upper portion thereof whereby heated air, generated via an electric heater within said the incubating chamber exhausts therethrough; and
   a base with wheels mounted thereon for facilitating transportation of the portable livestock incubating container.

2. The portable livestock incubating device of claim 1, further comprising:
   a generally rectangular, transparent window located on said first sidewall.

3. The portable livestock incubating device of claim 2, wherein said electric heaters are powered by a rechargeable battery are mounted to an inside surface of the second side wall near the top of the incubating container.

4. The portable livestock incubating device of claim 3, wherein said battery is stored within a protective housing having a closable lid, wherein the protective housing is mounted to an outer lower surface of the first side wall below said window.

5. The portable livestock incubating device of claim 3, further comprising a pair of u-shaped bottle holders mounted to the inside surface of the second side wall, wherein each bottle holder is positioned below and interior to each respective electric heater, wherein each of the pair of u-shaped bottle holders are designed and configured so as to slidably receive and hold a water bottle therein for providing water to livestock taking lodge within the incubating container.

6. The portable livestock incubating device of claim 1, further comprising a pair of storage compartments of a generally rectangular, hollow configuration are integrally formed above each access door inside the incubating container.

7. The portable livestock incubating device of claim 1, wherein said incubating container is constructed of aluminum material.

8. The portable livestock incubating device of claim 1, wherein said base with wheels mounted thereon comprises a wheel assembly that includes a wheel support chassis, axles, and axle supports.

9. The portable livestock incubating device of 1, claim wherein said incubating container has dimensions measuring approximately 8 feet in length by 6 feet in height by 4 feet in width.

10. The portable livestock incubating device of claim 1, further comprising a linearly elongated, rectangular floor divider mounted transversely and perpendicularly along a linearly elongated centerline of a wire-meshed floor in an upright fashion so as to provide a divider forming two lodging compartments for accommodating two animals within the incubating container.

11. The portable livestock incubating device of claim 10, wherein each end wall of the incubating container includes a generally rectangular clean out door hingedly attached to a lower portion thereof so as to provide access to the base.

\* \* \* \* \*